(12) United States Patent
Shrader et al.

(10) Patent No.: US 6,195,097 B1
(45) Date of Patent: Feb. 27, 2001

(54) WEB-BASED DCE MANAGEMENT

(75) Inventors: Theodore Jack London Shrader, Cedar Park; Richard Jay Cohen, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/889,727

(22) Filed: Jul. 8, 1997

(51) Int. Cl.[7] .................................................. G06F 13/00
(52) U.S. Cl. .......................................... 345/356; 345/346
(58) Field of Search ..................................... 345/335, 336, 345/326, 327–328, 329, 330, 331, 332, 333, 334, 337, 338, 339, 340, 356–357, 352–355, 341–349, 350–351; 707/10

(56) References Cited

U.S. PATENT DOCUMENTS

| | | | |
|---|---|---|---|
| 5,235,642 | 8/1993 | Wobber et al. | 380/25 |
| 5,504,921 | 4/1996 | Dev et al. | 712/1 |
| 5,506,955 | 4/1996 | Chen et al. | 714/26 |
| 5,572,643 | 11/1996 | Judson | 707/531 |
| 5,752,246 * | 5/1998 | Rosers et al. | 707/10 |
| 5,760,771 * | 6/1998 | Blonder et al. | 345/336 |
| 5,774,123 * | 6/1998 | Matson | 345/357 |
| 5,787,254 * | 7/1998 | Maddalozzo, Jr. et al. | 395/200.58 |
| 5,812,134 * | 9/1998 | Pooser et al. | 345/356 |
| 5,821,937 * | 10/1998 | Tonelli et al. | 345/356 |

OTHER PUBLICATIONS

"Object–Oriented User Administration", IBM Technical Disclosure Bulletin, May 1992, vol. 34, No. 12, pp. 461–465.

* cited by examiner

*Primary Examiner*—Steven Sax
(74) *Attorney, Agent, or Firm*—Jeffrey S. LaBaw; David Judson; Joseph R. Burwell

(57) ABSTRACT

A frames-based Web browser is used with existing distributed computing environment (DCE) interfaces to facilitate and simplify management of DCE cells. In the preferred embodiment, administration may be performed from any secure Web browser acting as a client. Management data is typically supported on a target Web server. at the browser, CGI scripts are used to dynamic generate HTML (hypertext markup language) pages based on the network administrator's selections and the current state and defined objects in the DCE cell. The result is a robust and efficient Web-based DCE management scheme.

24 Claims, 5 Drawing Sheets

WEB-BASED DCE MANAGEMENT

TECHNICAL FIELD

The present invention relates generally to administration and management of computer resources in a distributed computer network.

BACKGROUND OF THE INVENTION

The burdens on computer network administrators have been rapidly growing both in volume and in complexity. Chief among these burdens is the need for corporate administrators to manage their so-called "Distributed Computing Environment" cells. DCE is a known distributed environment that has been widely implemented using software available from the Open Systems Foundation (OSF). In a distributed computing environment, a group of machines is typically referred to as a "domain." An OSF DCE domain is called a "cell." A DCE cell is often a complex environment involving hundreds of machines in many locations.

DCE offers many management challenges to the network administrator. The management tasks are quite broad in scope, ranging from defining new accounts to retrieving the status of DCE servers. In the past, there has no been convenient user interface by which the administrator can perform these various management tasks in an efficient, consistent and reliable manner. For example, to define a DCE account, the administrator must create a DCE principal, add the principal to a group, add the principal to an organization, and then finally create the account. This operation requires access to multiple display menus and entry of numerous commands. AS another example, it is important for the network administrator to be aware of the current status of all DCE servers in the environment. Known DCE management interfaces do not provide simple graphical presentation of server status, and thus administrators cannot easily retrieve information about them so as to facilitate and execute management actions. As a result, known DCE management schemes presently implement complex, text-based management interfaces that include unnecessary information that complicates the efficient management of DCE cells.

The present invention addresses this important problem.

BRIEF SUMMARY OF THE INVENTION

It is a primary object of the invention to simplify the administration and management of DCE cells.

It is another primary object of the invention to provide for graphical-based administration of a DCE cell.

It is a further primary object to overlay a GUI-based interface over a command line interface by exploiting the known relationships between underlying objects and actions in the CLI interface.

It is a more general object of the invention to allow Web browser-based administration of a set of networked computers connecting in a distributed environment.

Yet another more specific object of this invention is to provide for DCE Web-based administration of a cell to allow network administrators to manage DCE cells from any secure World Wide Web or Internet client machine.

It is another object of the invention to enhance the consistency, simplicity and portability of DCE cell management and thereby enable network administrators to easily retrieve information on a DCE cell and execute management actions against such information.

Another more specific object of this invention is to provide a streamlined graphical user interface for DCE cell management to thereby reduce information overload during network administration.

Still another object of the invention is to take advantage of Web browser "frames" to present a network administrator with complementary input and output information between which the administrator may navigate to effect different management actions.

Another object is to enable the network administrator to easily determine the status of any DCE server in the environment.

The present invention takes advantage of a known Web browser mechanism and existing DCE interfaces to facilitate and simplify management of DCE cells. In the preferred embodiment, administration may be performed from any secure Web browser acting as a client. Management data is typically supported on a target Web server. at the browser, CGI scripts are used to dynamic generate HTML (hypertext markup language) pages based on the network administrator's selections and the current state and defined objects in the DCE cell. The result is a robust and efficient Web-based DCE management scheme that provides significant advantages over the simple text-based and other known interfaces of the prior art.

The Web-based interface design of the invention is hierarchical, starting with a logon page that allows the administrator to log into the cell that includes the target Web server. After logon, the administrator proceeds to a DCE Web Administration main menu from which a number of management actions may be launched including DCE command line operations (using the DCECP function), server status inquiries, and "fast path" tasks. Hyperlink references are provided to facilitate navigation options. From the DCECP Commands hyperlink, the administrator proceeds to a table display of the main functions available in DCECP, which include registry groupings of principals, groups, organizations and accounts. Management functions are facilitated using a dual frame display whenever information is input by the administrator in one frame while management data is simultaneous output in another frame. Preferably, form-based information is received in the first frame of the display. This frame technique maximizes interaction and feedback to the administrator, who would otherwise have to switch back and forth between the forms page and the output page to analyze the impact of administrative actions using the DCECP command functions.

The upper frame of the interface is preferably sub-divided into a number of display areas. In a command line interface, there are predetermined relationships between underlying objects and actions that make up the interface. A first display area of the upper frame of the invention displays a graphical representation of the CLI object/action hierarchy. Hyperlinks associated with the elements in the representation present the administrator with simple navigation options. A second display area includes a form by which the user types in, selects and/or checks information associated with a particular object/action relationship. A third display area may be used to display control elements. According to the invention, the user may navigate (within the first display area) between actions associated with the same object, in which case the interface preferably retains in the second display area a last context selected by the user. The user may also navigate within the first display area) to new objects, in which case the interface preferably refreshes the second display area as needed to illustrate a new context between the new object and its associated actions.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
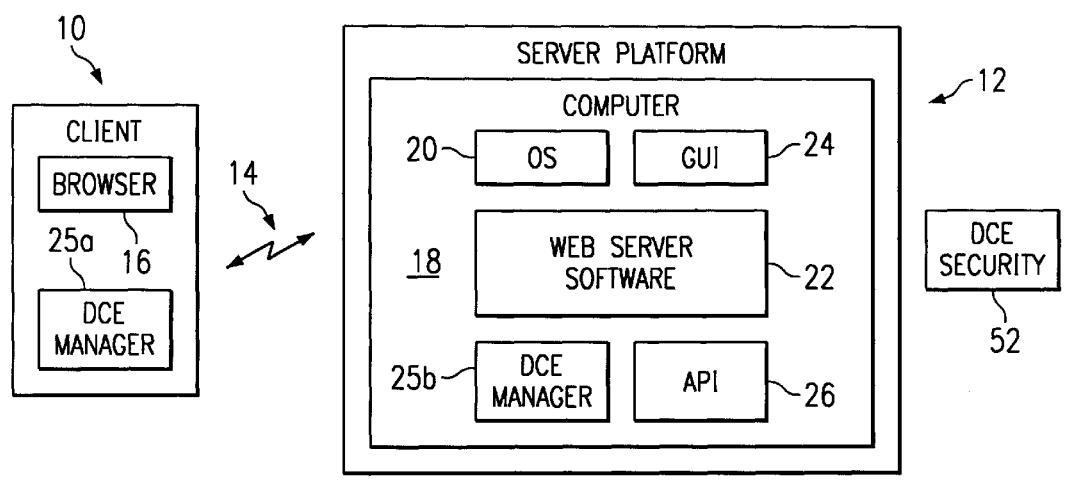
FIG. 1 is a representative system in which the present invention is implemented.

A representative system in which the present invention is implemented is illustrated in FIG. 1. A client machine 10 is connected to a Web server platform 12 via a communication channel 14. For illustrative purposes, channel 14 is the Internet, an Internet or other known network connection. Client and server, in turn, are located within a DCE domain or "cell", which is generally a set (of up to about 100) connected machines that share a single namespace. Web server platform 12 is one of a plurality of servers which are accessible by clients, one of which is illustrated by machine 10. It supports files in the form of hypertext documents and objects.

A representative client machine includes a browser 16, which is a known software tool used to access the servers of the network. Representative browsers that support frames include, among others, Netscape Navigator (2.x or higher) Microsoft Internet Explorer (3.x or higher) or the like, each of which are "off-the-shelf" or downloadable software programs. The Web browser 16 implements display "frames." A frame is a dedicated region or area of the browser display screen which includes separate display control elements such as scroll bars and the like. For additional background information on "frames," the reader is directed to Netscape Frames, at http://www.netscape.com/index, which is incorporated herein by reference. In the preferred embodiment, a "dual" frame approach is used, however, this is merely exemplary as any number of frames may be used in the DCE management interface.

A representative Web Server platform 12 comprises an IBM RISC System/6000 computer 18 (a reduced instruction set of so-called RISC-based workstation) running the AIX (Advanced Interactive Executive Version 4.1 and above) Operating System 20 and a Web server program 22, such as Netscape Enterprise Server Version 2.0. The platform 12 also includes a graphical user interface (GUI) 24 for management and administration. While the above platform is useful, any other suitable hardware/operating system/Web server combinations may be used.

The DCE cell includes a number of services including, among others, a Security Service 52. The DCE cell may use so-called DCE Kerberos-based authentication. A unix "credential" is associated with each operation and holds the local authentication information for that operation. In particular, a credential is a data structure defining a particular machine (or a user on a multi-user machine). The credential typically includes a user id, a group id, optionally a list of operating system privileges, and an authentication identifier known as a PAG (Process Authentication Group). The PAG acts as a tag for associating "tickets" between clients and the DCE Security Server 52. When users authenticate via the DCE Login facility, known as dce_login, the DCE Security Service interacts with the client (across the network) through a setpag() interface to establish the PAG/ticket relationship in the process's credential. When a user (at a client machine) has properly authenticated via a DCE login, the credential is retained at each end of the connection.

Figure 2:
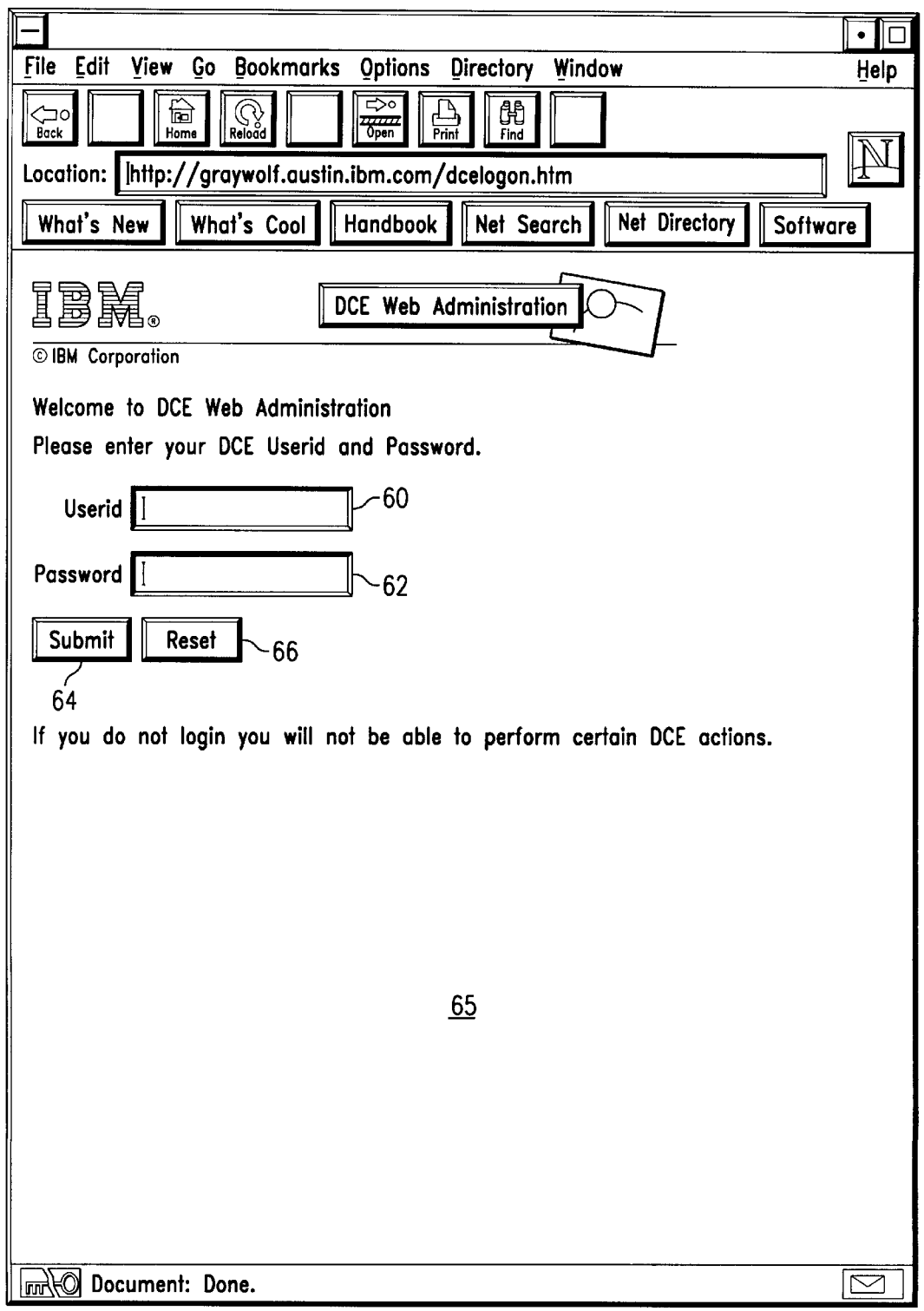
FIG. 2 is a representative display screen showing a DCE logon Web page.

According to the present invention, administrators manage the DCE cell from any secure Web browser, such as browser 16 shown in FIG. 1. In the preferred embodiment, the preferred interface is hierarchical. It may start with a logon page that allows DCE cell administrators and other users to log into the DCE cells that includes the target Web server. A representative logon page is illustrated in FIG. 2. It includes a fill-in form comprising a Userid field 60, a Password field 62, a Submit button 64 and a Reset button 66. Faced with this screen, the administrator may decline to logon but, in such case, he or she would be limited in which functions may be performed later. AS noted above, the display is located within a Web browser window 65. It may thus be considered to be a Web page.

Figure 3:
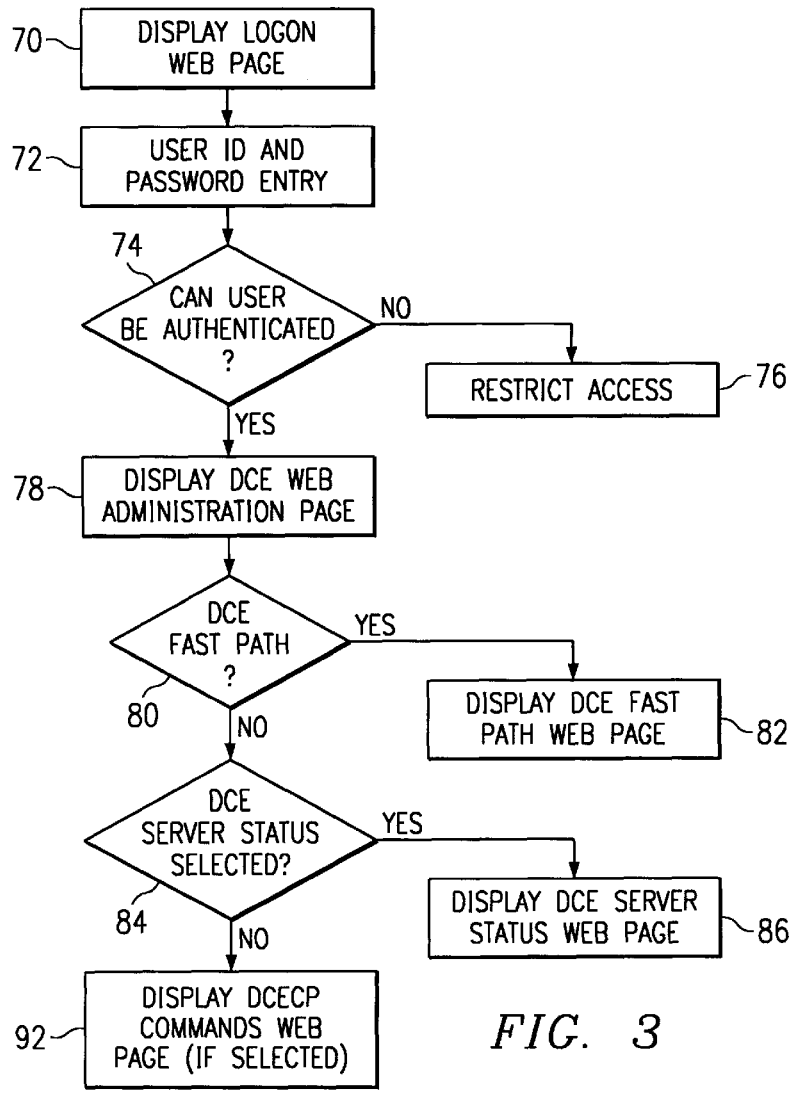
FIG. 3 is a flowchart illustrating the basic operation of the hierarchical display interface according to the present invention.

FIG. 3 is a flowchart illustrating the basic operation of the hierarchical display interface according to the present invention. at step 70, the logon page as illustrated in FIG. 2 is displayed. Thereafter, the user enters the userid and password at step 72. A check is then made at step 74 to determine whether the user can be authenticated. If the user cannot be authenticated, which is indicated by a negative outcome of the test at step 74, the routine continues at step 76 to restrict the user's access to the DCE management tasks. If, however, the user can be authenticated, the routine continues at step 78 to display a DCE Web Administration main menu. The main menu generally includes a list of high level management operations such as "DCE Fast Path," "DCE Server Status" and "DCECP Commands." These operations (and their associated commands are merely representative). At step 80, a test is performed to determine whether the administrator has selected the DCE Fast Path command. Such selection may be accomplished by clicking on a hypertext reference link associated with the command line, in a known manner. If the administrator has selected the DCE Fast Path command, the routine branches to step 82 to provide a new Web page from which a DCE Fast Path command may be implemented.

Fast Path commands allow the administrator to perform commonly used tasks in one step that usually require multiple steps. For example, the DCE Fast Path Tasks page provides the administrator with a link to a form where the administrator can define an account in one step without forcing the administrator to first create the principal, add the principal to a group, add the principal to an organization, and finally create the account. Of course, defining an account is merely one "Fast Path" task that may be implemented.

Figure 4:
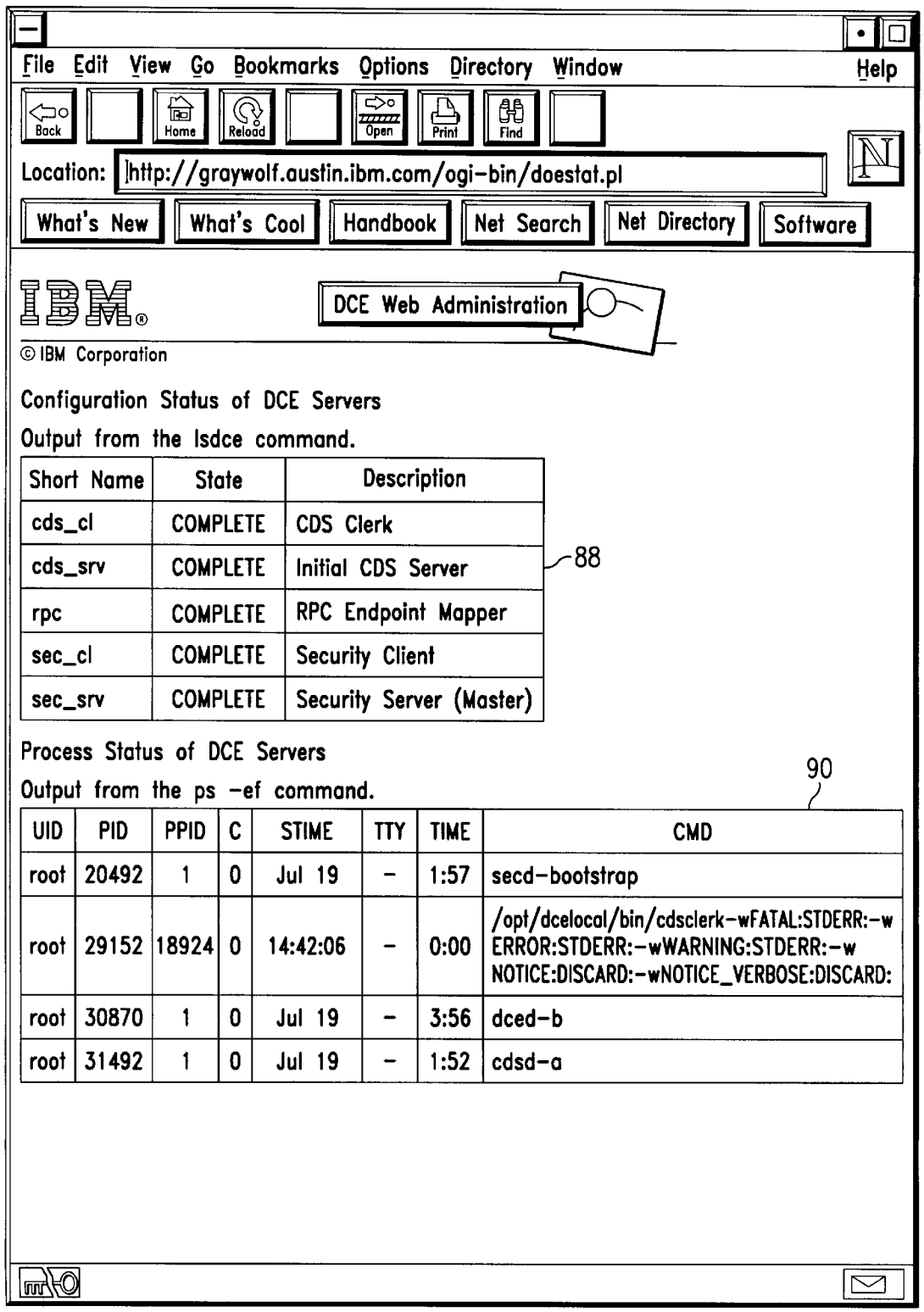
FIG. 4 is a representative display screen showing a DCE Server Status Web page.

If the outcome of the test at step 80 is negative, a test is then performed at step 84 to determine whether the administrator has selected (e.g., via activating a hypertext link) the DCE Server Status command from the main menu Web page. If so, the routine branches to step 86 to provide a display showing what servers are installed in the DCE cell and their current status. FIG. 4 represents the Web page display. AS illustrated, the page is maintained within the Web browser window and includes a first table 88 showing the "Configuration Status" Of DCE Servers and a second table 90 illustrating their "Process Status." The information is provided in a convenient, easy-to-understand format that may be readily accessed and used by the administrator. In particular, the information is presented in a manner expected by the administrator and without unnecessary data or other noise. Although not illustrated in detail, it should be appreciated that the mechanism also enables the administrator to obtain other attributes about the servers (e.g., such as which hostnames they reside on) as may be convenient.

Figure 5:
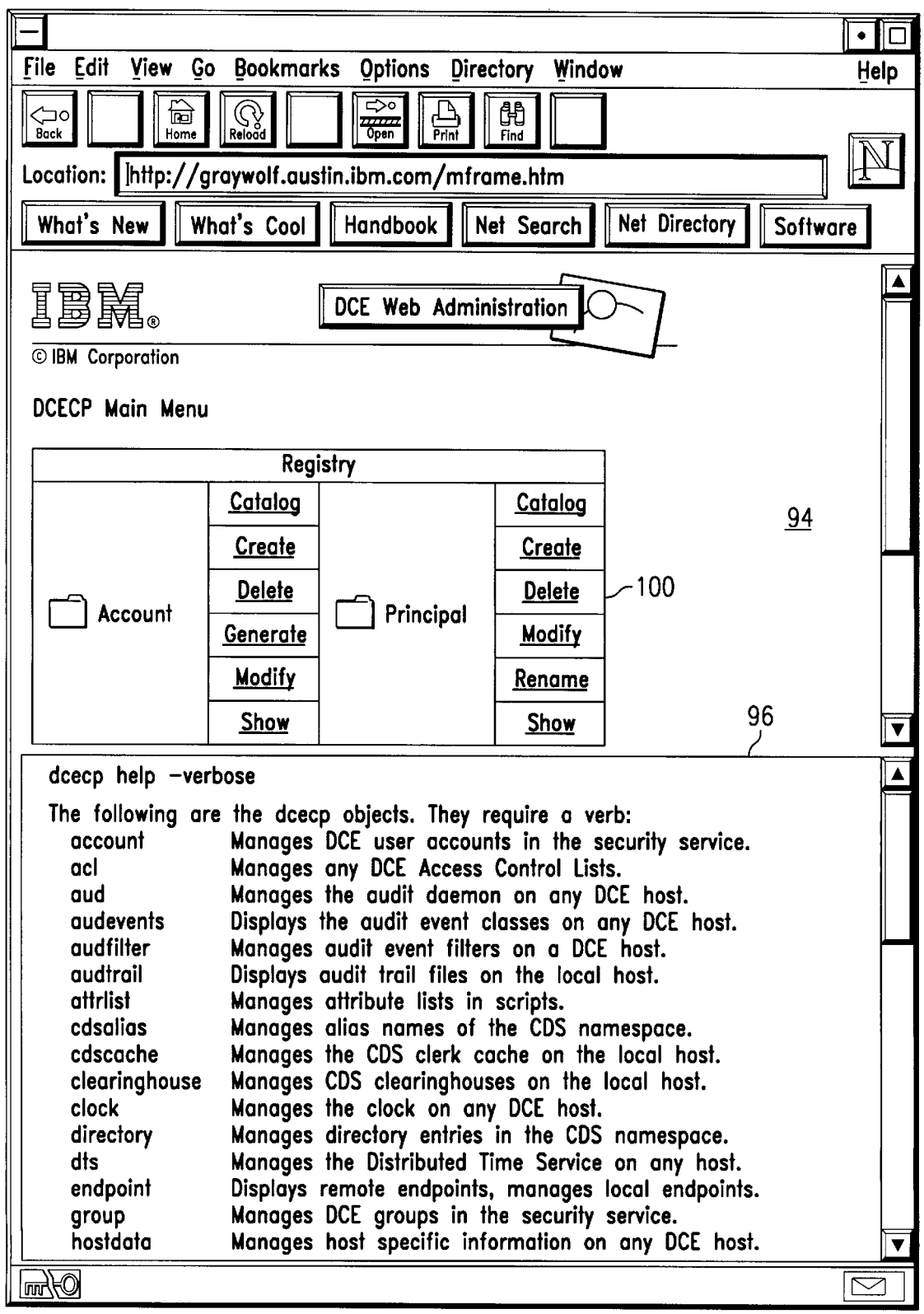
FIG. 5 is a representative display screen illustrating the DCECP Command Main Menu Web page.

Turning back to the operational flowchart of FIG. 3, if the outcome of the test at step 84 is negative, then it is assumed (if a selection has been made) that the user has selected the DCECP Commands entry in the main menu. Such selection, as noted above, may be effected by clicking on a hypertext link. This causes the routine to branch to step 92. at this point, the administrator proceeds to a new Web page illustrating a table display of the main functions available in DCECP. DCECP is a known administrative interface for performing DCE management tasks. An exemplary page is shown in FIG. 5. According to the present invention, the DCECP main menu Web page utilizes frames.

As shown, the Web browser has first and second frames 94 and 96, each of which includes its own set of control bars, in a known manner. The first and second frames could be side-by-side as opposed to one above the other. The relative size of the first and second frames may be different, and a different number of frames may be used. In this embodiment, the upper frame 94 includes the DCECP main menu table 100, and the lower frame 96 includes a display of management data (in this case a Help screen showing a DCECP object listing). The main menu table 100 is organized into a defined hierarchy with the various registry objects including account and principal. The group and organization objects, among others, are not shown. Although not illustrated, a DCE principal may belong to many groups but typically just one "primary" group. Likewise, a DCE organization may belong to many organizations but typically just one primary organization. AS can be seen, the registry object called "account" has a number of "actions" associated therewith: catalog, create, delete, generate, modify and show, and the registry object called "principal" has its associated action set. Each of the actions in a given set has associated therewith a hypertext link. Typically, the actions are operations that are common to more than one object (although this is not required). When the user moves the mouse pointer over the link, the link target is displayed in the Status bar 105. Activation (i.e. selection) of a link on the Web page generates an HTML request in a known manner.

Figure 6:
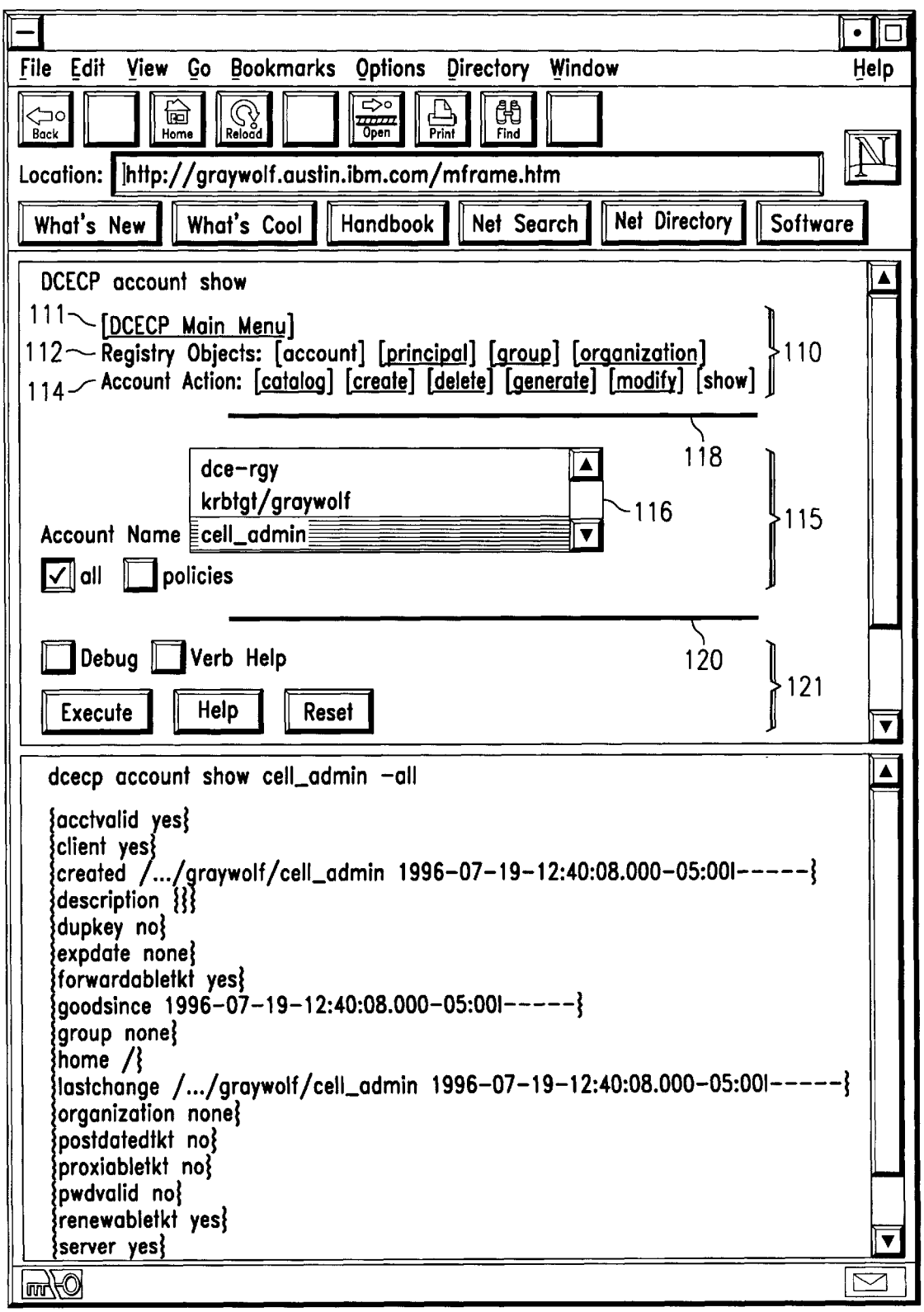
FIG. 6 is a representative display screen illustrating a DCECP Account Show Web page.

Generalizing, in the DCECP command line interface, there are predetermined "relationships" that exist between the underlying objects and their actions. A detailed description of these relationships is beyond the scope of the present invention, however, the inventive interface takes advantage of the known relationships between the underlying objects and actions to create a robust mechanism for presenting and manipulating information on top of a command line interface (CLI) such as DCECP. This is illustrated in FIG. 6 by way of example. FIG. 6 is a multi-frame Web page displayed when the administrator selects the account show action from the main menu table displayed in FIG. 5.

The upper frame comprises several areas, and the relative positions of each area as shown is merely illustrative. at the top of the frame (just below the title line), a data structure 110 is displayed in a first display area 109. Data structure 110 is a graphical representation of a hierarchy of the CLI interface and thus illustrates the known "relationships" between the various objects and their actions. In this representative embodiment (involving the DCECP CLI), the hierarchy comprises the DCECP main menu entry 111, a registry objects entry 112 including a set of registry objects each separated by [ ], and actions entry 114 including a set of actions each separated by [ ]. The graphical representation may take on other forms (such as the display of icons or other graphical devices) representing the various objects and actions. Preferably, each "element" of the representation includes a hypertext link associated therewith so that (in the context of a Web page) the particular object or action may be selected by a conventional point and click or other input method. If an element of the hierarchy is being currently displayed, it is typically highlighted (e.g., by bolding).

The DCECP command Web page upper frame also includes a second display area 115 located between a pair of display elements 118 and 120. Display area is variable and may include many different types of elements. Typically, this area includes a "form" displaying a set of elements (e.g., object names, account names, lists of attributes associated with objects, etc.) and an active control such as a scroll bar or other known device. In this particular example, the display area includes a listbox 116, although it should be appreciated that the actual graphical device (i.e. the form) displayed in area 115 will typically vary as the user undertakes to move through the hierarchy by pointing and clicking on the links.

The upper frame may also include a third display area 121 underlying the second display area 115. In general, display area 121 includes one or more dialog boxes, checkboxes and/or control buttons, for example, to facilitate the "execution" of the variable form information entered in the second display area 115. Thus, the Execute button packages the form information—whatever the user types in, selects and/or checks—in the display area 115, and passes it to the Web server for execution (typically via a CGI script). The resulting output or error information may then be displayed in the bottom frame. Additional controls may also be included in the third display area 121. For example, the Reset button sets all the variable form controls back to their initial values. A Debug checkbox allows the administrator to gain additional output in the bottom frame, such as the format and type of CGI parameters passed to the server. A Verb Help checkbox provides verbose textual help when the administrator selects the button. These controls are merely representative.

According to the present invention, the interface takes advantage of the existing object and action relationships of the CLI interface as such representations are set forth in the data structure 110. When the administrator moves from a first action to a second action associated with the same object, the interface retains (as a default) whatever last "context" exists in the second display area. Thus, for example in FIG. 6, the first action is "show" (which is bolded) and the object is "account." The predetermined relationship between the "account" object and the "show" action requires a listbox 116 of account names to be displayed in the second area (since the DCECP CLI syntax returns a list of account names as an argument to the account show command). The display illustrates the administrator selecting cell_admin from the list of accounts in the DCE cell, checking the "all" option, and pressing the "Execute" button in the top frame. In response, an HTML request is issued to the target Web server to Which the secure Web client is connected. A management task is effected at the Web server (preferably via a CGI script), and the resulting management data is returned to the Web client and displayed in the bottom frame. The bottom frame shows the results of executing the action, which is all the attributes and values stored on the cell_admin account object.

Now, as discussed above, it is assumed that the administrator moves from the "show" action to the "modify" action. In other words, the administrator has moved between actions for the same object (in this case, the "account" object). The first action may be considered a currently-selected action and the new action may be considered a target action. In the preferred embodiment, the listbox 116 in the second display area remains persistent, as the interface defaults to the last context used by the administrator. Thus, the interface infers that the administrator desires to modify the properties of cell_admin, although the administrator may select some other account name.

Instead of just moving between actions for a given object, the administrator may desire to move to a new object. In the example shown in FIG. 6, this operation would be effected by the administrator pointing and clicking on another registry object (sometimes referred to as a "target") in line 112 of the hierarchy. In this case, the existing relationship between the target object and the currently-selected action may (or may not) dictate an alternate display element in the second display area. If, as a result of this relationship, a new display element is required, the display area 115 is refreshed with a new form or other required element. The display area 115 thus displays a given "context" associated with a given object and a given action. Thus, for example, if the administrator were to click on the group link in FIG. 6 (given that account and show were the current selections), the group link would be highlighted (and the account link highlight removed), the display area 115 would be refreshed with a new listbox including a list of "groups." This new listbox represents a new context. One of the groups (preferably the "primary" group of the previously selected account, by default) would be highlighted. New control buttons (associated with the new object/action relationship) will then be displayed in the third display area 121. The administrator then uses this newly-refreshed upper frame to continue the management operation.

Generalizing, the upper frame of the interface (which may be the entire screen if desired) includes a first display area in which is displayed a graphical representation of the CLI object/action hierarchy. Hyperlinks associated with the elements in the representation present the administrator with simple navigation options. A second display area includes a form by which the user types in, selects and/or checks information associated with a particular object/action relationship. The user may navigate in the first display area between actions associated with the same object, in which case the interface preferably retains in the second display area a last context selected by the user. The user may also navigate in the first display area to new objects, in which case the interface preferably refreshes the second display area as needed to illustrate a new context between the new object and its associated actions.

Thus, in the illustrated embodiment of FIG. 6, the first entry 111 gives the administrator the chance to make a major traversal back up the administration tree by hopping back to the DCECP Main Menu Web page. This is accomplished as noted above by placing the cursor on the DCECP Main Menu link and clicking. Additional "major" navigation options may also be available on this line if desired. The second line (reference numeral 112) allows the administrator to navigate between related object groups. The third line (reference numeral 114) allows the administrator to navigate between actions on the same DCE object.

Preferably, the DCE object and action navigation links for the elements being displayed are in bold and are not selectable on the page to which they are related. This provides a further navigation clue, besides the title, regarding which action(s) the administrator can perform. The second and third navigation lines of the hierarchy 110 provide a powerful set of architectural links for administrators to quickly and easily perform different actions without having to traverse up and down a fixed hierarchy. As previously noted, preferably the contents of the bottom frame will not change until the Execute or Help buttons (in the third display area) are pressed.

Preferably, the two frame design of FIG. 6 is utilized whenever form-based information is needed and some output of management data may be generated. Generally, the top or upper frame displays the form that the administrator fills out in preparation of executing a given command or action, while the bottom frame shows the output of the command or action. In addition, most Web browsers allow users to copy or save text from either frame for inclusion in reports or other files. Thus, information set forth in the various frames may be copied into other documents and saved in a known manner.

The use of browser frames in which command and actions, on the one hand, and management data, on the other hand, are manipulated, provides significant advantages in the context of a DCE management scheme. This approach maximizes interaction and feedback to the administrator. For example, the administrator can quickly select an account name from the list of accounts in the DCE cell in the top frame, press the Execute button at the bottom of the top frame and have the results appear in the bottom frame. To perform the action on another account, the administrator can follow the same steps without needing to switch pages. When the administrator switches to another action, such as from account catalog to account show, the top frame will change, but the contents of the bottom frame preferably will not change. This gives the administrator a chance to view the results of a previous action and make a next action based an observation of the previous results, all without having to switch to another page or interface.

The present invention provides numerous advantages over the prior art. An existing secure Web browser can be used to manage DCE cells. The browser interface is well-known and easy to use. It affords a consistent and reliable means by which a network administrator can retrieve management information from a server in the DCE cell. Management is simplified by presenting information hierarchically and through exploitation of the known DCE object/action interfaces. Using Web-based CGI scripting, the tool reacts dynamically to administrator selections and the current state and defined objects in the DCE cell. The interface is highly streamlined and, typically, does not attempt to represent every DCE object as an icon or graphic on the Web page.

The frame-based approach described in the preferred embodiment offers significant advantages. Without this design, the administrator would have to view the results of his or her administrative actions on a separate page and then switch back and forth between the forms page and the output page. Non-frame based Web browsers would also have to present their results in this way.

In the preferred embodiment, the DCECP command Web pages are not statically defined HTML pages (although they could be). Instead, these command pages take advantage of CGI scripting to dynamically generate HTML pages based on the administrator's actions and selections. For example, in the illustrated embodiment discussed above, there is no "account_show.htmil" page per se. Rather, when the administrator selects the account show action, a CGI script builds the HTML page, filling in dynamic information, such as the current list of accounts in the DCE cell, and sends this information back to the secure Web browser client for presentation to the administrator. This implementation has many advantages in eliminating the need for multiple static Web pages. It also reacts to and presents changeable information in the cell.

This Web-based design uses the DCE command line program, DCECP, to effect most of the administrator's tasks. This provides the administrator with a direct correlation between actions performed in the Web interface to commands and tasks that can be performed with DCECP on the workstation or via a telnet connection to the workstation. DCECP is not a required part of the design, however. The CGI scripts behind the Web pages may interface with a custom-built daemon to process the administrator-initiated commands.

Another advantage is that inventive interface is portable to many versions of DCE since it uses the standard DCECP command line interface. It only needs to be recompiled, if implemented in a non-interpreted language, per operating system platform, not per version of DCE. The interface is also portable to many Web servers since it is preferably implemented as CGI scripts, not as special plug-ins or additions to the Web server application. Moreover, in the preferred embodiment, the interface does not require Web client side changes. This enables any frame-enabled Web browser to be used.

The present invention includes a "client" component resident on a computer configured as a secure Web client, and a "server" component resident on a computer configured as a target Web server. Management information is generally supported on the target Web server and is thus accessible to a user (e.g., a network administrator) operating the client machine after a logon in which a "credential" is maintained at each end of the Internet connection.

The present invention is not limited to management of DCE "cells" either. One of ordinary skill in the art will appreciate that the inventive use of a Web-based or other graphical user interface may be implemented in any distributed computing environment (not merely OSF DCE) wherein it is desired to have an administrator manage client machines in secure manner using a CLI. Moreover, the set of DCE-based objects and actions are merely representative as well, and the present invention should be broadly construed to cover any interface that presents a set of objects and a set of actions and allows the user (e.g., an administrator) to select both an object and an action and then switch between respective objects or actions. The interface may be generalized to any display tool that presents the results of a prior-executed action while allowing the user to select a new object and action to be executed.

One of the preferred implementations of the Web-based DCE management scheme of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Internet client" should be broadly construed to mean any computer or component thereof directly or indirectly connected or connectable in any known or later-developed manner to a computer network, such as the Internet. The term "Internet server" should also be broadly construed to mean a computer, computer platform, an adjunct to a computer or platform, or any component thereof. Of course, a "client" should be broadly construed to mean one who requests or gets the file, and "server" is the entity which downloads the file. It should also be appreciated that the present invention could be used to cache data and programs at a local server serving a set of Internet clients from a master server to conserve network resources.

Having thus described my invention, what I claim as new and desire to secure by letters patent is set forth in the following claims.

What is claimed is:

1. A method for effecting user requested tasks in a distributed computing environment having a client connectable to a server, wherein a user requested task is defined by an action on an object within a hierarchical set of objects, each of which can be operated upon by one or more associated actions, the method comprising the steps of:

displaying a first set of graphical indicators, wherein each graphical indicator in the first set of graphical indicators represents an object within the hierarchical set of objects, and wherein an object within the hierarchical set of objects is a selected object;

displaying a second set of graphical indicators, wherein each graphical indicator in the second set of graphical indicators represents an action in the one or more associated actions that may operate upon an object representatively displayed in the first set of graphical indicators, and wherein an action in the one or more associated actions is a selected action;

displaying a form containing context information associated with a first context between a selected object and a selected action, whereby the form, the first set of graphical indicators, and the second set of graphical indicators are simultaneously displayed;

in response to a user selection of a graphical indicator either in the first set of graphical indicators or in the second set of graphical indicators, refreshing the context information in the form to illustrate a second context between a selected object and a selected action; and in response to a user action, processing the form to initiate execution of the user requested task.

2. The method of claim 1 wherein the user requested task is a system administration management task, the method further comprising:

requesting execution of a management script in the server; and receiving management data from the server.

3. The method of claim 2 further comprising:

displaying simultaneously the returned management data with the first set of graphical indicators and the second set of graphical indicators.

4. The method of claim 2 wherein the system administration management task performs an operation for a distributed computing environment cell.

5. The method of claim 1 wherein the client is a Web client and the server is a Web server.

6. The method of claim 5 wherein the request from the Web client to the Web server is an Hypertext Markup Language (HTML) request.

7. The method of claim 1 wherein the form, the first set of graphical indicators, and the second set of graphical indicators are organized as a Web page.

8. The method of claim 7 wherein the first set of graphical indicators and the second set of graphical indicators are hypertext links within the Web page.

9. The method of claim 1 further comprising:

displaying the form, the first set of graphical indicators, and the second set of graphical indicators as a first frame within a Web browser window.

10. The method of claim 9 wherein the user requested task is a system administration management task, the method further comprising:

requesting execution of a management script in the server;

receiving management data from the server; and displaying the returned management data in a second frame within the Web browser window.

11. A computer program product on a computer readable medium for use in a data processing system for effecting user requested tasks in a distributed computing environment having a client connectable to a server, wherein a user requested task is defined by an action on an object within a hierarchical set of objects, each of which can be operated upon by one or more associated actions, the computer program product comprising:

instructions for displaying a first set of graphical indicators, wherein each graphical indicator in the first set of graphical indicators represents an object within the hierarchical set of objects, and wherein an object within the hierarchical set of objects is a selected object;

instructions for displaying a second set of graphical indicators, wherein each graphical indicator in the second set of graphical indicators represents an action in the one or more associated actions that may operate upon an object representatively displayed in the first set of graphical indicators, and wherein an action in the one or more associated actions is a selected action;

instructions for displaying a form containing context information associated with a first context between a selected object and a selected action, whereby the form, the first set of graphical indicators, and the second set of graphical indicators are simultaneously displayed;

instructions for refreshing, in response to a user selection of a graphical indicator either in the first set of graphical indicators or in the second set of graphical indicators, the context information in the form to illustrate a second context between a selected object and a selected action; and instructions for processing, in response to a user action, the form to initiate execution of the user requested task.

12. The computer program product of claim 11 wherein the user requested task is a system administration management task, the computer program product further comprising:

instructions for requesting execution of a management script in the server, and instructions for receiving management data from the server.

13. The computer program product of claim 12 further comprising:

instructions for displaying simultaneously the returned management data with the first set of graphical indicators and the second set of graphical indicators.

14. The computer program product of claim 12 wherein the system administration management task performs an operation for a distributed computing environment cell.

15. The computer program product of claim 11 wherein the client is a Web client and the server is a Web server.

16. The computer program product of claim 15 wherein the request from the Web client to the Web server is an Hypertext Markup Language (HTML) request.

17. The computer program product of claim 11 wherein the form, the first set of graphical indicators, and the second set of graphical indicators are organized as a Web page.

18. The computer program product of claim 17 wherein the first set of graphical indicators and the second set of graphical indicators are hypertext links within the Web page.

19. The computer program product of claim 11 further comprising:

instructions for displaying the form, the first set of graphical indicators, and the second set of graphical indicators as a first frame within a Web browser window.

20. The computer program product of claim 19 wherein the user requested task is a system administration management task, the computer program product further comprising:

instructions for requesting execution of a management script in the server;

instructions for receiving management data from the server; and instructions for displaying the returned management data in a second frame within the Web browser window.

21. An apparatus for effecting user requested tasks in a distributed computing environment having a client connectable to a server, wherein a user requested task is defined by an action on an object within a hierarchical set of objects, each of which can be operated upon by one or more associated actions, the apparatus comprising:

first displaying means for displaying a first set of graphical indicators, wherein each graphical indicator in the first set of graphical indicators represents an object within the hierarchical set of objects, and wherein an object within the hierarchical set of objects is a selected object;

second displaying means for displaying a second set of graphical indicators, wherein each graphical indicator in the second set of graphical indicators represents an action in the one or more associated actions that may operate upon an object representatively displayed in the first set of graphical indicators, and wherein an action in the one or more associated actions is a selected action;

third displaying means for displaying a form containing context information associated with a first context between a selected object and a selected action, whereby the form, the first set of graphical indicators, and the second set of graphical indicators are simultaneously displayed;

refreshing means for refreshing, in response to a user selection of a graphical indicator either in the first set of graphical indicators or in the second set of graphical indicators, the context information in the form to illustrate a second context between a selected object and a selected action; and processing means for processing, in response to a user action, the form to initiate execution of the user requested task.

22. The apparatus of claim 21 wherein the form, the first set of graphical indicators, and the second set of graphical indicators are displayed as a first frame within a Web browser window.

23. The apparatus of claim 22 wherein the user requested task is a system administration management task, the apparatus further comprising:

requesting means for requesting execution of a management script in the server;

receiving means for receiving management data from the server; and fourth displaying means for displaying the returned management data in a second frame within the Web browser window.

24. The apparatus of claim 21 wherein the form, the first set of graphical indicators, and the second set of graphical indicators are organized as a Web page.

* * * * *